US007184763B2

(12) United States Patent
Roy et al.

(10) Patent No.: US 7,184,763 B2
(45) Date of Patent: Feb. 27, 2007

(54) VHF GROUND STATION SELECTION ALGORITHM

(75) Inventors: Aloke Roy, Gaithersburg, MD (US); Jonathan Walker, Crofton, MD (US)

(73) Assignee: Honeywell International, Inc., Morristown, NJ (US)

( * ) Notice: Subject to any disclaimer, the term of this patent is extended or adjusted under 35 U.S.C. 154(b) by 495 days.

(21) Appl. No.: 10/347,777

(22) Filed: Jan. 21, 2003

(65) Prior Publication Data

US 2003/0139181 A1    Jul. 24, 2003

Related U.S. Application Data

(60) Provisional application No. 60/350,645, filed on Jan. 22, 2002.

(51) Int. Cl.
H04Q 7/20    (2006.01)
(52) U.S. Cl. .................. 455/431; 455/441; 455/513; 455/525
(58) Field of Classification Search ............... 455/427, 455/431, 450–452, 512–513, 62, 67.13, 525, 455/441, 442
See application file for complete search history.

(56) References Cited

U.S. PATENT DOCUMENTS

| 3,543,161 | A | * | 11/1970 | Hindson et al. | ............ | 455/502 |
|---|---|---|---|---|---|---|
| 3,659,085 | A | * | 4/1972 | Potter et al. | ............ | 701/207 |
| RE28,762 | E | * | 4/1976 | Toman | ............ | 342/408 |
| 4,937,822 | A | | 6/1990 | Weddle et al. | | |
| 5,123,112 | A | * | 6/1992 | Choate | ............ | 455/524 |
| 5,170,401 | A | | 12/1992 | Mohr | | |
| 5,212,804 | A | * | 5/1993 | Choate | ............ | 455/431 |
| 5,249,303 | A | * | 9/1993 | Goeken | ............ | 455/431 |
| 5,363,402 | A | | 11/1994 | Harmon | | |
| 5,473,754 | A | | 12/1995 | Folwell et al. | | |
| 5,491,834 | A | * | 2/1996 | Chia | ............ | 455/441 |
| 5,678,185 | A | * | 10/1997 | Chia | ............ | 455/437 |
| 6,064,890 | A | * | 5/2000 | Hirose et al. | ............ | 455/513 |
| 6,087,973 | A | | 7/2000 | Rowe et al. | | |
| 6,104,926 | A | * | 8/2000 | Hogg et al. | ............ | 455/431 |
| 6,175,314 | B1 | | 1/2001 | Cobley | | |
| 6,216,267 | B1 | | 4/2001 | Mitchell | | |
| 6,313,759 | B1 | | 11/2001 | Musland-Sipper | | |
| 6,430,412 | B1 | * | 8/2002 | Hogg et al. | ............ | 455/436 |
| 6,477,163 | B1 | * | 11/2002 | Miller | ............ | 370/347 |
| 6,546,259 | B1 | * | 4/2003 | Vendryes | ............ | 455/513 |
| 6,741,554 | B2 | * | 5/2004 | D'Amico et al. | ............ | 370/225 |
| 2004/0142658 | A1 | * | 7/2004 | McKenna et al. | ............ | 455/11.1 |

* cited by examiner

*Primary Examiner*—Binh K. Tieu
(74) *Attorney, Agent, or Firm*—McDonnell Boehnen Hulbert & Berghoff LLP (57) ABSTRACT

An apparatus, method and computer program for initiating and maintaining a virtual connection between a mobile radio and a ground station, including receiving a plurality of ground station radio signals from a mobile radio; accumulating over a time period signal quality information relative to each of the ground station radio signals; determining a signal quality parameter trend for each of the ground station radio signals as a function of the accumulated signal quality information; deciding to switch a current virtual connection between the mobile radio and a first ground station to a virtual connection between the mobile radio and a different second ground station as a function of comparing the signal quality parameter to a pre-selected minimum acceptable threshold signal quality parameter; and switching the virtual connection of the mobile radio from the first ground station to the second ground station.

24 Claims, 3 Drawing Sheets

VHF GROUND STATION SELECTION ALGORITHM

This application claims the benefit of U.S. Provisional Application Ser. No. 60/350,645, filed in the names of Aloke Roy and Jonathan Walker on Jan. 22, 2002, the complete disclosure of which is incorporated herein by reference.

FIELD OF THE INVENTION

The present invention relates to very high frequency (VHF) radio communication devices and methods, and in particular to selection of ground stations for airborne VHF radio communications.

BACKGROUND OF THE INVENTION

Communications over the VHF medium is limited to line of sight restrictions, i.e. the transmitter and the receiver must be within clear line-of-sight to communicate with each other. Any obstruction by building or terrain may attenuate the VHF signal significantly and cause a communications interruption. As VHF is the primary mode of air/ground data communications, the system must be able to overcome these path blockages to provide reliable connectivity between the aircraft and the system of ground stations (GS).

Category-A Aircraft Communications Addressing and Reporting System (ACARS) is a connection-less, broadcast data link. All ground stations within the line-of-sight of an aircraft capture each downlink message and forward it to an intended destination. Although this approach creates multiple copies of the same message on the ground network, it effectively addresses the VHF path blockage problem.

Category-B ACARS is connection-less but point-to-point data link. The aircraft detects a received signal strength indicator (RSSI) of all ground stations within line-of-sight and directs downlinks to a specific GS having the highest signal strength. Only the addressed GS receives and processes the downlink. If the aircraft receives no response to its downlink, it directs the transmission to the next best GS as determined by the RSSI. Therefore, Category-B ACARS eliminates the multiple copies in the ground network at the cost of added delay due to re-transmission of downlinks when no response is received from the selected GS. The aircraft traverses through the coverage region of a GS very rapidly, typically within 10 to 12 minutes. Therefore, the optimum GS as determined by the RSSI is expected to change frequently, which causes the downlinks to be directed to different stations. Both ACARS systems being connectionless, there is no overhead associated with switching the transmission from one GS to another.

The next generation data link, called VHF Digital Link (VDL), is currently being implemented. VDL is a connection-oriented system whereby the aircraft must establish a virtual connection with a specific GS before any user data can be exchanged air-ground. Similar to Category-B ACARS, VDL uses the received signal quality parameter (SQP) to select the optimum GS with which to communicate. The connection establishment process requires an exchange of information between the aircraft and the chosen GS, which adds delay and protocol overhead.

Unfortunately, the REF environment changes rapidly for an aircraft moving at a high speed, which is several hundred miles per hour for commercial aircraft. As a result, the instantaneous nature of the received signal strength makes it a poor metric for selecting the optimum GS with which to communicate. Some GS selection implementations combine distance estimation with RSSI/SQP to improve the GS selection algorithm, but do not compensate for rapidly changing RF environment. This approach has limitations. Aircraft and ground station position information is not always available to compute the distance. Also, this approach may select a less optimum ground station from RF overhead perspective in situations when the aircraft is moving away from the selected ground station. In this case, the aircraft will be within the VHF coverage region for a shorter period of time and connection to a new ground station must be established sooner. Such frequent ground station switching reduces effective RE bandwidth available for transferring user data because connectivity changes require additional messages to be exchanged over the RF.

SUMMARY OF THE INVENTION

Aeronautical VHF frequencies are known to be a very limited resource. Therefore, it is desirable that the VDL and Category-B ACARS select an optimum ground station that minimizes system overhead and delay by maximizing connectivity time. Accordingly, the present invention provides an efficient algorithm for selecting such an optimum ground station. The algorithm of the invention provides an optimum air/ground communications path while minimizing RF overhead associated with connection switching as an aircraft moves from the coverage region of one ground station to the coverage region of another.

The ground station selection algorithm (GSSA) of the invention uses historical RSSI/SQP data from all ground stations within line-of-sight for dynamically establishing a signal quality trend, which is subsequently used to select an optimum ground station. Use of historical trend information eliminates the effect of instantaneous RSSI/SQP by normalizing instantaneous high or low values caused by aircraft banking, multipath, interference, shadowing, and other RF environmental conditions.

The ground station selection algorithm of the invention dynamically predicts future SQP of a ground station based on historic RSSI/SQP data collected during flight. It establishes the signal quality trend based on predicted values. The trend is used to select a ground station that will maximize the duration of the air-ground link for optimum communications. A threshold value is used for the predicted SQP to identify the minimum acceptable signal quality for good VHF communications. The optimum ground station is the one having an increasing trend and a SQP higher than, but as close as possible, to the threshold. This represents a scenario where the aircraft is approaching the ground station with persistently good signal quality and has a longer lifetime, thus resulting in reduced RF overhead due to connectivity changes.

There are several commercial off-the-self (COTS) algorithms that can be used to determine the future signal quality trend based on observed values. Two such algorithms are Linear Regression Analysis, and Alpha-Beta Filtering. Other suitable COTS algorithms are known and are considered equivalent alternatives.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

The present invention is an apparatus, method and computer program for initiating and maintaining a virtual connection between a mobile radio and a ground station, including means for receiving a plurality of ground station radio signals from a mobile radio; means for accumulating over a time period signal quality information relative to each of the ground station radio signals; means for determining a signal quality parameter trend for each of the ground station radio signals as a function of the accumulated signal quality information; means for deciding to switch a current virtual connection between the mobile radio and a first ground station to a virtual connection between the mobile radio and a different second ground station as a function of comparing the signal quality parameter to a pre-selected minimum acceptable threshold signal quality parameter, and means for switching the virtual connection of the mobile radio from the first ground station to the second ground station.

According to one embodiment of the invention, the means for determining a signal quality parameter trend for each of the ground station radio signals is means for performing linear regression and analysis on the signal quality parameter information relative to each of the ground station radio signals.

According to another embodiment of the invention, the means for determining a signal quality parameter trend for each of the ground station radio signals is means for computing either a median or a mean of the signal quality parameter information, and means for predicting a next signal quality parameter for each of the ground station radio signals using alpha-beta filter equations. The means for using alpha-beta filter equations includes implementing the alpha-beta filter equations in either hardware or software.

Figure 1:
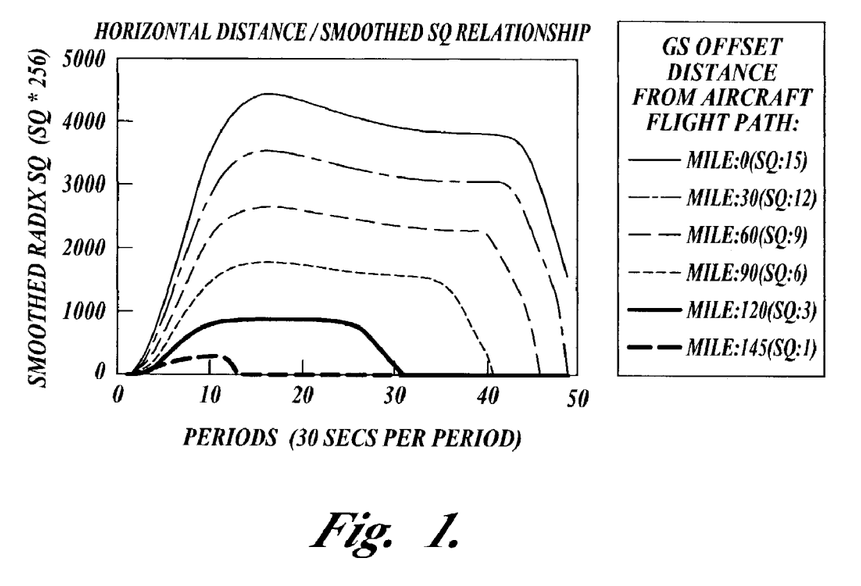
FIG. 1 shows the variation in signal quality parameter or SQP from different ground stations as an aircraft flies along a straight line at constant speed and altitude through a ground station region.

FIG. 1 shows the variation in signal quality parameter or SQP from different ground stations as an aircraft flies along a straight line at constant speed and altitude through a ground station region. Typically, the received RF signal from a ground station is expected to have a pseudo-normal distribution as an aircraft passes through its coverage region. An increasing trend indicates that the aircraft is approaching the ground station; while a decreasing trend indicates that either the aircraft is moving away from the ground station or the VHF line-of-sight is being lost due to shadowing terrain or other RF environmental conditions. When a ground station lies along the flight path, the peak amplitude of the signal reaches the highest level and the aircraft remains within the service volume of this ground station for a maximum period of time. As illustrated, the peak amplitude and the duration with service volume are somewhat reduced when the ground station is offset from the aircraft's flight path. FIG. 1 shows smoothed examples of the signal quality relationship of the received RF to offsets of the aircraft's flight path from the ground station of 0; 30, 60, 90, 120 or 145 miles, as described in the legend.

Figure 2:
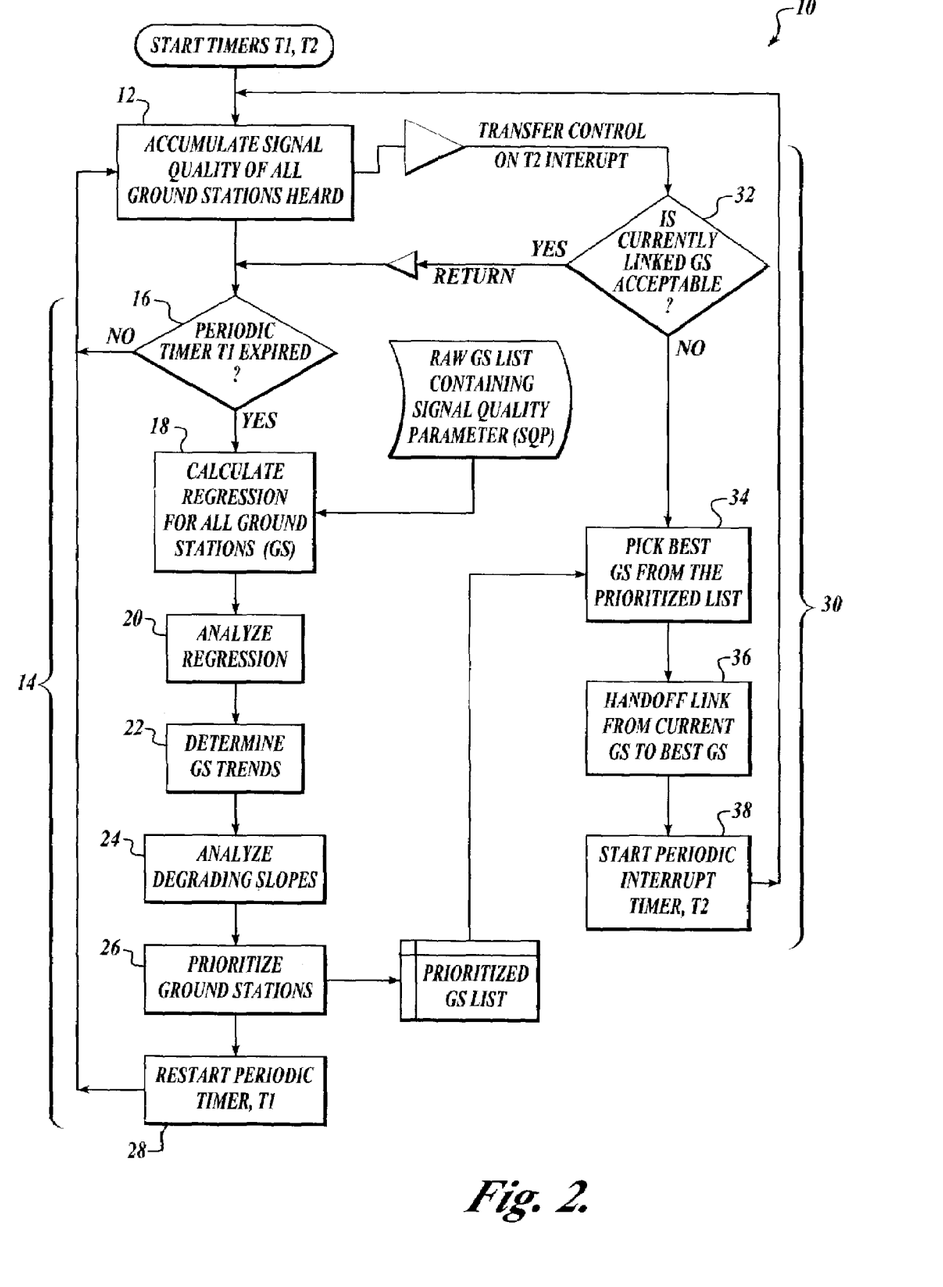
FIG. 2 is a flowchart illustrating one embodiment of the ground station selection algorithm of the invention.

According to one embodiment, the ground station selection algorithm, or GSSA, of the invention is implemented in software which is optionally encoded on a computer-usable medium, such as a compact-disc (CD) floppy diskette, or other medium, or may be provided in software form downloadable over the internet. Once the VHF radio is activated, it continuously monitors the channel activities. Each time the radio detects an uplink transmission, the received signal is forwarded to the ground station selection algorithm, which executes in a continuous loop as shown in the flowchart of FIG. 2: The ground station selection algorithm of the invention requires that a virtual connection be established between the mobile radio and a ground station as soon as the mobile radio detects a ground station. The ground station selection algorithm of the invention causes the mobile radio to maintain the connection continuously as it moves through the coverage regions of different ground stations.

The ground station selection algorithm is optionally used to select the first ground station for initial connection establishment. In practice, the first connection is made with a limited historic knowledge as the initial connection should be made as soon as possible to reduce communication link downtime. At this time only one ground station reply signal has been received so very little signal history exists, perhaps as little as a single data point. In applications where 30 to 60 seconds of no communications can be tolerated initially, the ground station selection algorithm of the invention is also used for establishing the initial connection. In such applications, the switching of the connection described in operation 36 (FIG. 2) and operation 62 (FIG. 3) makes a new connection to establish the initial connection.

The ground station selection algorithm uses two timers to interrupt the normal data collection process. A periodic timer T1 is used by the ground station selection algorithm in calculating a SQP trend for all ground stations as a function of the signal data collected during the last timer interval. A periodic interrupt timer T2 is operated as a link viability timer and is used in determining whether the current virtual connection is to be switched to different ground station due to degrading signal quality.

FIG. 2 illustrates the ground station selection algorithm of the invention embodied in a flowchart 10, wherein the ground station selection algorithm calculates a SQP trend for all ground stations as a function of the signal data collected during an interval of the periodic timer T1. Initially, the periodic timer T1 and periodic interrupt timer T2 are initialized and started.

One function of the ground station selection algorithm of the invention is accumulation of information as to the viability of each ground station from which a response signal is received. Accordingly, the ground station selection algorithm of the invention provides computer-readable code 12 that is configured to cause a computer processor to initially accumulate the SQ of all available ground stations during an interval of the periodic timer, T1.

12: Accumulation of SQ of all available ground stations. Each time a VHF radio uplink is detected by the radio, the ground station selection algorithm of the invention records time corresponding to the ground station address, the signal quality SQ, and the time. This data is stored in a list that is grouped as a function of ground station address.

Another function of the ground station selection algorithm of the invention is calculation of a SQP trend for all ground stations as a function of the signal data collected during an interval of the periodic timer T1. Accordingly, the ground station selection algorithm of the invention provides computer-readable code 14 that is configured to cause a computer processor to accomplish the following set of operations.

16: Monitoring of the periodic timer T1. The periodic timer T1 is monitored, and when period T1 expires, the following operations 18–28 are executed.

18: Performance of regression. Linear regression is performed on the SQP with respect to time for the radio signals received from each ground station in the list of signal data collected during an interval of the periodic timer T1.

20: Analysis of regression. Slope, i.e., regression coefficient, and intercept data are obtained from analysis of the linear regression and used to predict a SQP of the radio signals received from each ground station at current time.

22: Determination of ground station trends. The slope or regression coefficient is used to predict a SQP trend for each ground station in the list. If the slope is positive, the SQP is rising. A rising SQP implies that the mobile radio is approaching that ground station. A negative slope or falling SQP, on the other hand, indicates that the signal is fading. In other words, the mobile radio is moving away from that ground station. The amplitude of the slope determines how rapidly the signal is increasing or fading. The amplitude of the slope thus implies how rapidly the aircraft is approaching or departing the ground station site. As a function of the slope sign and amplitude data of the SQP trend, the received ground station radio signals, which may be identified by the originating ground stations, are classified into one of two groups: "Rising" and "Degrading," although other terms may be used to relay similar meaning. Further sub-classification of the received radio signals is performed based on the predicted SQP at current time. The number of sub-groups and the delineation level is flexible, and is tailored to the operating environment and the sensitivity of the radio. For aeronautical VHF radios, the SQP range of 0 to 15 is usefully grouped as:

| | | |
|---|---|---|
| Excellent | 12 to 15; |
| Good | 8 to 11; |
| Fair | 4 to 7; and |
| Poor | 0 to 3. |

Using these groupings, a total of eight possible group/sub-group combinations are developed: rising-excellent, rising-good, rising-fair, rising-poor, degrading-excellent, degrading-good degrading-fair, and degrading-poor.

24: Analysis of degrading slopes. The received radio signals, or the originating ground stations, classified as "degrading" are further analyzed to predict a duration after which the predicted SQP of these stations will fall below a minimum acceptable threshold. The current SQP and the regression equation are used to compute this duration, called here a Projected Minimum Degradation Allowance (PMDA). The PMDA indicates how long the signal received from a ground station will have an acceptable signal quality for maintaining a link. Longer PMDA duration indicates longer connectivity time.

26. Prioritization of ground stations. A prioritized list of all received radio signals, or the originating ground stations, in the list is prepared based on the expected duration of a connection at current time, i.e., the PMDA duration. The received radio signals, or the originating ground stations, classified as "rising" are given higher priority than "degrading" stations, because the PMDA of a rising station is indefinite. If additional information, such as the geographic location of the mobile and ground stations are available, such location can be factored into the prioritization process. The received radio signals, or the originating ground stations, are prioritized from highest to lowest according to priority rules, with the ground station having the best SQP and a positive regression slope being given the highest priority, with high priorities being given to ground stations having lesser SQP but still positive regression slopes. Lesser priorities are given to ground stations having negative regression slopes, i.e., fading or "degrading" signals. The lowest priorities are given to ground stations having only single reference point on which to predict a SQP trend. If multiple stations exist within each priority class, then preference is given to the ground station having highest current SQP within the same priority class. The ground station selection algorithm of the invention may be practiced using other suitable priority rules.

According to one embodiment of the invention, the ground stations are prioritized from highest to lowest according to the following set of priority rules.

Excellent SQP with positive regression slope;
Good SQP with positive regression slope;
Fair SQP with positive regression slope;
Excellent SQP and Longest PMDA period, has degrading regression;
Good SQP and Longest PMDA period; has degrading regression;
Fair SQP and Longest PMDA period, has degrading regression;
Geographically Closest Station and in the Excellent SQP Range, if location information is available;
Geographically Closest Station and in the Good SQP Range, if location information is available;
Highest Excellent SQP with only Single Point;
Highest Good SQP with only Single Point;
Poor SQP with + regression slope only, no degrading regression;
Highest Fair SQP with only Single Point;
Poor SQP and Longest PMDA period, has degrading regression;
Geographically Closest Station and in the Poor SQP Range; and
Highest Poor SQP with only Single Point.

28: Storing prioritized ground station list and restarting periodic timer T1. The prioritized received ground station radio signals list is stored for future connectivity decision processing, but the raw ground station radio signal SQP data collected during the previous period T1 time period is cleared. Periodic timer T1 is restarted and the process resumes at the beginning.

Another function 30 performed by the ground station selection algorithm is determination of whether the current virtual connection is to be switched to a different ground station due to degrading signal quality of the current SQP trend. Accordingly, the ground station selection algorithm of the invention provides additional computer-readable code configured to cause a computer processor to accomplish the following operations. These additional operations are executed upon expiration of the link viability timer, periodic interrupt timer T2.

32: Determine acceptability of actively linked ground station. The current SQP value, as determined in the previously executed operation 20, of each ground station having an active link is examined. If the current SQP is above a pre-selected minimum acceptable threshold; the ground station selection algorithm repeats calculating of a SQP trend for all ground stations as a function of the signal data collected during a next interval of the periodic timer T1. However if the current SQP is below the pre-selected acceptable threshold, the virtual connection is switched to the current highest priority ground station.

A decision is made by the ground station selection algorithm to switch the virtual connection to the optimum of the available ground stations when the SQP of the current ground station falls below the minimum threshold. If the current SQP is above the threshold but the received ground station radio signal has a degrading slope, then the PMDA, as determined in previously executed operations 22 and 24, of the linked ground station is compared with a pre-selected minimum acceptable PMDA threshold. If the PMDA is less than the minimum threshold, then a decision is made by the ground station selection algorithm to switch the connection.

34: Determine a new optimum ground station. If a switch decision is made, the highest priority GS is selected from the prioritized list stored in the previously executed operation 28. If, however, the current station is the highest priority GS, or no GS is available in the prioritized list, no action is taken.

36: Switching the ground station. In operation 36 the virtual connection is switched over to this highest priority ground station.

38: Restarting periodic interrupt timer T2. After the ground station switching operation is executed, timer T2 is restarted to operate as a link viability timer, and the process resumes at the beginning of the loop to accumulate SQ of all available ground stations.

Alternative Embodiment

Linear regression analysis is computationally intensive. In addition, floating point arithmetic is preferred for regression computation according to at least one embodiment of the invention. These capabilities may not be available in dedicated, real-time processors. As such, the ground station selection algorithm of the invention is alternatively embodied using a combination of a median, or mean, filter and an alpha-beta filter that are implemented in either software or hardware.

Figure 3:
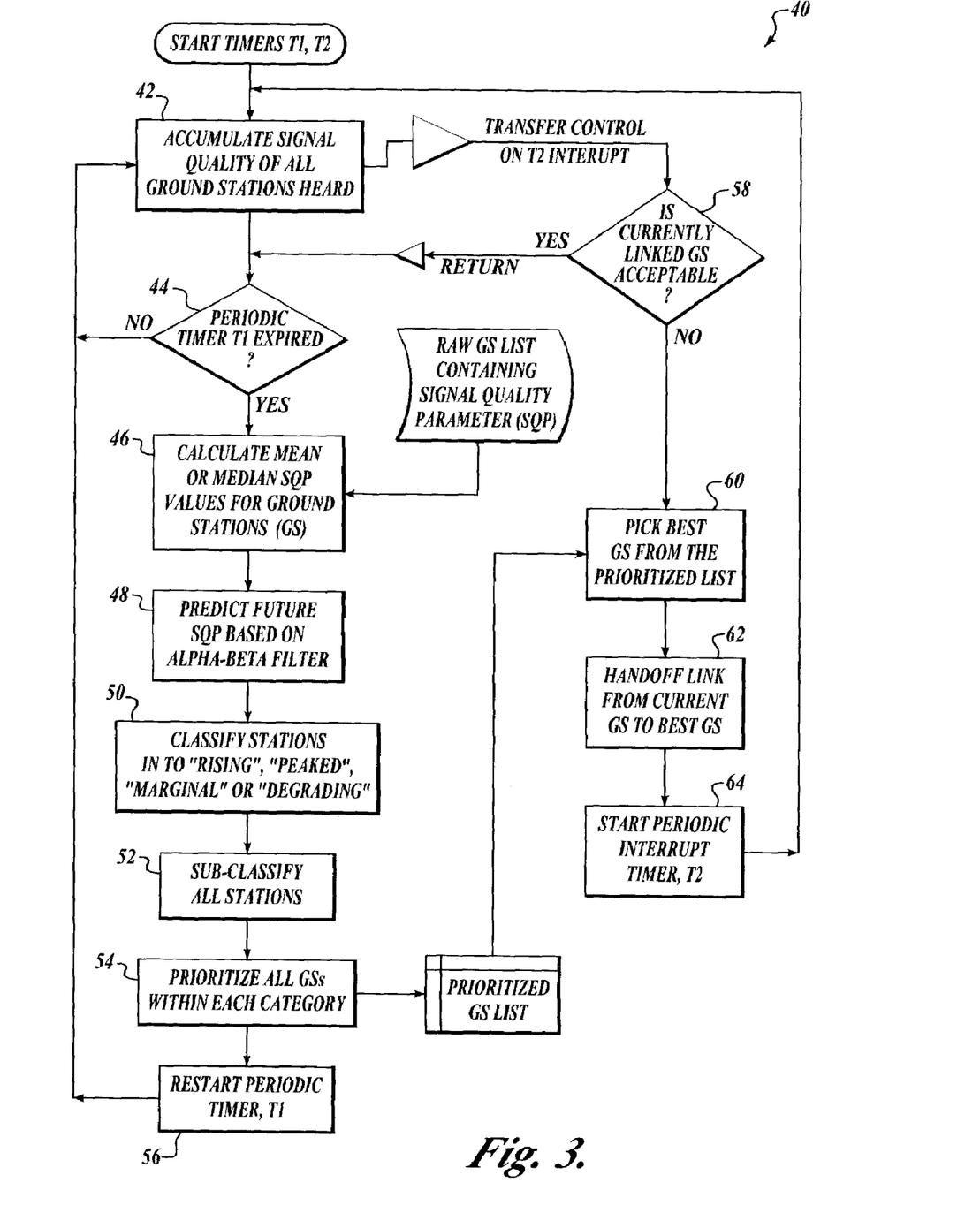
FIG. 3 illustrates one alternative ground station selection algorithm of the invention embodied in a set of processing operations that are optionally implemented in either software or hardware.

FIG. 3 illustrates the alternative ground station selection algorithm of the invention embodied in a flow chart 40 of processing operations that are optionally implemented in either software or hardware. A periodic: timer T1 is again used in calculating a SQP trend for all ground stations as a function of the signal data collected during the last timer interval. A periodic interrupt timer T2 again operates as a link viability timer and is used in determining whether the current virtual connection is to be switched to different ground station due to degrading signal quality.

The alternative ground-station selection algorithm of the invention also functions to: accumulate information as to the viability of each ground station from which a response signal is received; calculate a SQP trend for all ground stations as a function of the signal data collected during an interval of the periodic timer T1; determine whether the current virtual connection is to be switched to different ground station due to degrading signal quality of the current SQP trend; and if a switch decision is made, to switch the virtual connection to the highest priority ground station of the prioritized list of stored ground stations.

Accordingly, in Block 42 after the periodic timer T1 and periodic interrupt timer T2 are initialized and started, the alternative ground station selection algorithm of the invention provides means for initially accumulating the SQ of all available ground stations during an interval of the periodic timer T1. Each time an uplink is detected by the radio, the time corresponding ground station address, the signal quality, and the time are recorded, and this data is stored in a list grouped as a function of ground station address.

The periodic timer T1 is monitored in Block 44, and when period T1 expires, the ground station selection algorithm of the invention is operated to calculate a SQP trend for all ground stations as a function of the signal data collected during an interval of the periodic timer T1. Accordingly, in Blocks 46-56 the ground station selection algorithm of the invention provides means for accomplishing all of the following set of operations.

In Block 46 either the median or the mean SQP value, $U_k$, is computed for each ground station for which a signal is received in the previous T1 period. In Block 48 the next expected SQP for each ground station is predicted according to the alpha-beta filter equations:

$$E_\Delta = U_k - Y_k;$$

$$X_k = Y_k + \alpha E_\Delta;$$

$$V_k = V_{k-1} + \beta E_\Delta; \text{ and}$$

$$Y_{k+1} = X_k + V_k;$$

where:
$U_k$ is the statistical median of all the uplinks received within this Trend Period K,
K is a Trend Period sample index starting from K=1,
K−1 is the previous Trend Period sample index,
K+1 is the next Trend Period sample index,
$E_\Delta$ is the error of the most recent signal quality received and its predicted value,
α is a predefined constant,
$\beta = \alpha^2/2$,
$V_k$=Velocity at sample K, and defaults to 0 if first calculation ($V_0$=0),
$V_{k-1}$=Velocity at previous sample K−1,
$X_k$=Smoothed Signal Quality at sample K, and
$Y_k$=Predicted Signal Quality at sample K, defaults to U if first calculation ($Y_1 = U_1$).

In Block 50 each ground station is classified into one of four categories: "Rising," "Peaked," "Marginal," and "Degraded" by applying classification rules described in Tables 1 and 2. "Velocity history" is given by:

$\Delta V_k$ is the difference of Velocity $V_k$ and the previous Velocity $V_{k-1}$ according to: $\Delta V_k = V_k - V_{k-1}$.

$\Delta V_{k-1}$ is the difference of Velocity $V_{k-1}$ and the previous Velocity $V_{k-2}$ according to: $\Delta V_{k-1} = V_{k-1} - V_{k-2}$.

$\Delta V_{k-2}$ is the difference of Velocity $V_{k-2}$ and the previous Velocity $V_{k-3}$ according to: $\Delta V_{k-2} = V_{k-2} - V_{k-3}$.

TABLE 1

Velocity Categories 1st Pass

| Velocity Category | Conditions |
| --- | --- |
| Degrading | At least 3 samples exist AND Velocity is negative AND Velocity History shows decreasing negative Velocities. (k − 3 >= 0) AND ($V_k$ < 0) AND ($V_k$ <= $V_{k-1}$ <= $V_{k-2}$ < 0) |
| Peaked | At least 4 samples exist AND Velocity History shows negative delta Velocities (k − 4 >= 0) AND ($\Delta V_k$ < 0 AND $\Delta V_{k-1}$ < 0 AND $\Delta V_{k-2}$ < 0) |
| Rising | At least 4 samples exist AND Velocity is positive AND |

TABLE 1-continued

Velocity Categories 1st Pass

| Velocity Category | Conditions |
|---|---|
| | Velocity History showing positive delta Velocity. (k − 4 >= 0) AND ($V_k$ > 0) AND ($\Delta V_k$ > 0 AND $\Delta V_{k-1}$ > AND $\Delta V_{k-2}$ > 0) |
| Marginal | If the Velocity Category is none of the above, a second pass is made for the Ground Station using Table 2 to determine if it is really Marginal in the order and logic presented in that table. |

TABLE 2

Velocity Categories 2nd Pass

| Velocity Category | Conditions |
|---|---|
| Peaked | At least 4 samples exist AND Velocity is positive AND at least one Velocity History shows delta Velocities of at most Threshold 'H'. (k − 4 >= 0) AND ($V_k$ > 0) AND ($\Delta Vk$ <= H OR $\Delta Vk - 1$ <= H OR $\Delta Vk - 2$ <= H) |
| Degrading | At least 4 samples exist AND Velocity is negative AND at least one Velocity History shows delta Velocities of at most Threshold 'H'. (k − 4 >= 0) AND ($V_k$ < 0) AND ($\Delta V_k$ <= H OR $\Delta V_{k-1}$ <= H OR $\Delta V_{k-2}$ <= H) |
| Rising | At least 4 samples exist AND Velocity is positive AND at least one Velocity History shows positive or zero delta Velocity. (k − 4 >= 0) AND ($V_k$ > 0) AND ($\Delta V_k$ >= 0 OR $\Delta V_{k-1}$ >= 0 OR $\Delta V_{k-2}$ >= 0) |
| Marginal | If the station is not categorized by any of the above 1st nor 2nd passes, then the station is marginal. |

In Block 52 each ground station within the four categories is further sub-classified into "Excellent," "Good," "Fair," and "Poor" sub-categories as a function of its smoothed signal quality ($X_k$). As an enhancement to the algorithm, sub-classification of the rising stations is optionally performed as a function of the expected peak SQP that is derived by comparing the initial velocities of rising stations with that of the peaked stations. Boundaries between the sub-classes are as a function of the RF operating environment. For the aeronautical VHF radios, the SQP range of 0 to 15 is usefully grouped as described herein.

According to one embodiment of the invention, in Block 54 the ground stations are prioritized from highest to lowest according to the following set of priority rules.

Ground stations that have a Rising Velocity with an $X_k$ currently FAIR or above are given the highest priority.

Ground stations that have a Peaked Velocity with an $X_k$ of FAIR or above are given a next highest priority.

Ground stations that are marginal with $X_k$ of FAIR or above are given a next highest priority.

Ground stations that have a Degrading Velocity with $X_k$ in EXCELLENT range are given a lower priority.

Ground stations that have a Rising Velocity with an $X_k$ currently POOR are given a lower priority.

Ground stations that have a Peaked Velocity with an $X_k$ to be POOR are given a lower priority.

Ground stations that are Marginal with POOR $X_k$ are given a yet lower priority.

Ground stations that have a Degrading Velocity with $X_k$ of GOOD or below are given a stilt lower priority.

Any other ground station based on highest $X_k$ are given lowest priority.

In Block 56 the ground station selection algorithm of the invention provides means for storing the prioritized ground station list for future connectivity decision processing, but the raw ground station SQP data and the output of the median, or mean, filter collected during the previous T1 time period is cleared. The ground station selection algorithm of the invention also provides means for restarting timer T1 and resuming the process at the beginning.

Additional operations are executed to determine whether the current virtual connection is to be switched to different ground station when the link viability timer, T2 expires. Accordingly, in Block 58 the alternative embodiment of the invention provides means for examining the median, or mean, SQP value, $U_k$, as determined in Block 46, of each ground station having an active link. If the $U_k$ is below a pre-selected threshold, means are provided for deciding to switch the virtual connection to the best available ground station.

If a switch decision is made, then in Block 60 the ground station selection algorithm of the invention provides means for selecting the highest priority ground station from the prioritized list stored in Block 56, and in Block 62 the virtual connection is switched over to this highest priority ground station. If the current station is the highest priority ground station or no ground station is available in the prioritized list, no action is taken.

In Block 64 the ground station selection algorithm of the invention provides means for restarting timer T2 and the process resumes at the beginning.

While the preferred embodiment of the invention has been illustrated and described, it will be appreciated that various changes can be made therein without departing from the spirit and scope of the invention.

What is claimed is:

1. A computer program residing on a computer usable storage medium, the computer program comprising:
   computer-readable program code means for accumulating signal data relative to each of one or more ground stations from which a mobile radio receives a radio signal;
   computer-readable program code means for determining a signal quality parameter trend for the radio signal received from each of the one or more ground stations as a function of the signal data accumulated;
   computer-readable program code means for comparing a signal quality of a current one of the ground stations with a minimum threshold signal quality; and
   computer-readable program code means for continuously maintaining a current virtual connection between the mobile radio and a current one of the ground stations while the signal quality of the current ground station is greater than the minimum threshold signal quality, and switching the virtual connection to a different one of the ground stations when the signal quality of the current ground station is less than the minimum threshold signal quality.

2. The computer program product of claim 1, further comprising computer-readable program code means for receiving at intervals one or more radio signals from a mobile radio.

3. The computer program product of claim 1, further comprising computer-readable program code means for switching the virtual connection between the mobile radio and the ground station to a virtual connection between the mobile radio and a different one of the one or more ground stations.

4. The computer program product of claim 1 wherein the computer-readable program code means for determining whether a current virtual connection is to be switched further comprises computer-readable program code means for determining whether a current virtual connection is to be switched as a function of the signal quality parameter trend.

5. The computer program product of claim 1 wherein the computer-readable program code means for accumulating signal viability information further comprises computer-readable program code means for operating in a continuous loop with each of the computer-readable program code means for calculating a signal quality parameter trend and the computer-readable program code means for determining whether a current virtual connection is to be switched.

6. The computer program product of claim 1, further comprising computer-readable program code means for establishing the virtual connection be between the mobile radio and one of the ground stations.

7. The computer program product of claim 1 wherein the computer-readable program code means for determining whether a current virtual connection is to be switched further comprises computer-readable program code means for predicting a duration after which the signal quality parameter of the radio signal received from one or more of the ground stations will fall below a minimum acceptable signal quality parameter threshold.

8. A ground station selection algorithm, comprising:
means for receiving a plurality of ground station radio signals from a mobile radio;
means for accumulating over a time period signal quality information relative to each of the ground station radio signals;
means for determining a signal quality parameter trend for each of the ground station radio signals as a function of the accumulated signal quality information;
means for predicting a duration after which a signal quality of a current ground station radio signal will fall below a minimum acceptable threshold;
means for comparing the predicted duration with a minimum threshold duration; and
means for deciding to switch a current virtual connection between the mobile radio and a first ground station to a virtual connection between the mobile radio and a different second ground station as a function of determining that the predicted duration is less than the minimum threshold duration.

9. The ground station selection algorithm of claim 8 wherein the means for deciding to switch the current virtual connection further comprises means for comparing the signal quality parameter to a pre-selected minimum acceptable threshold signal quality parameter.

10. The ground station selection algorithm of claim 8, further comprising means for prioritizing each of the ground station radio signals as a function of the corresponding signal quality parameter trend.

11. The ground station selection algorithm of claim 8 wherein the means for deciding to switch the current virtual connection further comprises means for switching the virtual connection of the mobile radio from the first ground station to the second ground station.

12. The ground station selection algorithm of claim 8 wherein the means for determining a signal quality parameter trend for each of the ground station radio signals further comprises means for performing one of:

a regression analysis on the signal quality parameter information relative to each of the ground station radio signals; and
computing one of a median and a mean of the signal quality parameter information, and predicting a next signal quality parameter for each of the ground station radio signals using alpha-beta filter equations.

13. The ground station selection algorithm of claim 8 wherein the means for predicting a duration after which a signal quality of a current ground station radio signal will fall below a minimum acceptable threshold further comprises predicting the as a function the signal quality parameter trend.

14. A ground station selection algorithm comprising:
a computer-usable medium having computer-readable code embodied therein for configuring a computer processor, the computer program product comprising:
computer-readable code configured to cause a computer processor to receive one or more ground station radio signals from a mobile radio during a first time interval;
computer-readable code configured to cause a computer processor at expiration of the first time interval to:
determine a signal quality parameter trend of each of the ground station radio signals,
classify each of the ground station radio signals as a function of the signal quality parameter trend,
prioritize the ground station radio signals, and
store the prioritized the ground station radio signals as a list of ground station radio signals;
computer-readable code configured to cause a computer processor to determine viability of a current virtual connection between the mobile radio and a first ground station from which a ground station radio signal originates;
computer-readable code configured to cause a computer processor to continuously maintain the current virtual connection as a function of determining a continued viability of the current virtual connection; and
computer-readable code configured to cause a computer processor to change the virtual connection from the first ground station to a second different ground station corresponding to one of the ground station radio signals of the list of ground station radio signals as a function of a failure of the viability of the current virtual connection.

15. The ground station selection algorithm of claim 14, further comprising:
computer-readable code configured to cause a computer processor receive one or more second ground station radio signals from a mobile radio during a second time interval;
computer-readable code configured to cause a computer processor at expiration of the second time interval to:
determine a signal quality parameter trend of each of the second ground station radio signals received during the second time interval,
classify each of the second ground station radio signals as a function of the signal quality parameter trend,
prioritize the second ground station radio signals, and
store the prioritized the second ground station radio signals as a second list of ground station radio signals;
computer-readable code configured to cause a computer processor to determine viability of a current virtual connection between the mobile radio and a current ground station from which a ground station radio signal originates; and computer-readable code configured to cause a computer processor to change the virtual connection from the current ground station to a different ground station corresponding to one of the ground station radio signals of the second list of ground station radio signals as a function of the viability of the current virtual connection.

16. The ground station selection algorithm of claim 14 wherein the computer-readable code configured to cause a computer processor to determine a signal quality parameter trend of each of the ground station radio signals further comprises computer-readable code configured to cause a computer processor to perform linear regression on the signal quality parameter with respect to time, and analysis of the linear regression.

17. The ground station selection algorithm of claim 16 wherein the computer-readable code configured to cause a computer processor to perform linear regression and analysis on the signal quality parameter further comprises computer-readable code configured to cause a computer processor to predict a signal quality parameter of each of the ground station radio signals as a function of regression coefficient and intercept data obtained from the analysis of the linear regression.

18. The ground station selection algorithm of claim 14 wherein the computer-readable code configured to cause a computer processor to determine a signal quality parameter trend of each of the ground station radio signals further comprises computer-readable code configured to cause a computer processor to predict a signal quality parameter of each of the ground station radio signals as a function of one of a median filter and a mean filter, and an alpha-beta filter.

19. The ground station selection algorithm of claim 14 wherein the computer-readable code configured to cause a computer processor to prioritize the ground station radio signals further comprises computer-readable code configured to cause a computer processor to prioritize the ground station radio signals as a function of the signal quality parameter trend of each of the respective ground station radio signals.

20. The ground station selection algorithm of claim 19 wherein the computer-readable code configured to cause a computer processor to prioritize the ground station radio signals as a function of the signal quality parameter trend further comprises prioritize the ground station radio signals as a function of one of a rising and degrading nature of the signal quality parameter trend.

21. A method for maintaining a air-ground radio communications link between a mobile radio and a ground station, the method comprising:
   receiving a plurality of ground station radio signals from a mobile radio;
   accumulating over a time period signal quality information relative to each of the ground station radio signals;
   determining a signal quality parameter trend for each of the ground station radio signals as a function of the accumulated signal quality information;
   deciding to switch a current virtual connection between the mobile radio and a first ground station to a virtual connection between the mobile radio and a different second ground station as a function of comparing the signal quality parameter to a pre-selected minimum acceptable threshold signal quality parameter; and
   switching the virtual connection of the mobile radio from the first ground station to the second ground station.

22. The method of claim 21, further comprising prioritizing each of the ground station radio signals as a function of the corresponding signal quality parameter trend.

23. The method of claim 21 wherein determining a signal quality parameter trend for each of the ground station radio signals further comprises performing linear regression and analysis on the signal quality parameter information relative to each of the ground station radio signals.

24. The method of claim 21 wherein determining a signal quality parameter trend for each of the ground station radio signals further comprises:
   computing one of a median and a mean of the signal quality parameter information, and
   predicting a next signal quality parameter for each of the ground station radio signals using alpha-beta filter equations.

* * * * *

UNITED STATES PATENT AND TRADEMARK OFFICE
CERTIFICATE OF CORRECTION

PATENT NO. : 7,184,763 B2
APPLICATION NO. : 10/347777
DATED : February 27, 2007
INVENTOR(S) : Aloke Roy et al.

It is certified that error appears in the above-identified patent and that said Letters Patent is hereby corrected as shown below:

Col 12, line 12, insert --duration-- after the phrase "predicting the"

Col 12, line 12, insert --of-- after the phrase "as a function"

Col 12, line 28, delete "the" after the phrase "store the prioritized"

Col 12, line 60, delete "the" after the phrase "store the prioritized"

Col 14, line 6, delete "a" after the word "maintaining", and insert --an-- after the word "maintaining"

Signed and Sealed this

Thirteenth Day of November, 2007

JON W. DUDAS
*Director of the United States Patent and Trademark Office*